United States Patent [19]

Roudebush, Jr.

[11] 4,358,751

[45] * Nov. 9, 1982

[54] AUTOMATICALLY CANCELLING TURN SIGNAL APPARATUS

[75] Inventor: Robert D. Roudebush, Jr., Long Grove, Ill.

[73] Assignee: Signal Sentry Industries, Inc., Wheeling, Ill.

[ * ] Notice: The portion of the term of this patent subsequent to Nov. 14, 1995, has been disclaimed.

[21] Appl. No.: 960,797

[22] Filed: Nov. 14, 1978

Related U.S. Application Data

[63] Continuation-in-part of Ser. No. 397,675, Sep. 17, 1973.

[51] Int. Cl.$^3$ .............................................. B60Q 1/34
[52] U.S. Cl. .................................. 340/73; 340/52 R; 340/56; 340/815.30; 200/61.27
[58] Field of Search ...................... 340/73, 74, 75, 76, 340/52 R, 56, 377; 200/61.28, 61.88, 61.27, 61.37, 61.39; 180/170; 324/160, 161, 165; 116/35 R, 37, 62.1

[56] References Cited

U.S. PATENT DOCUMENTS

| | | | |
|---|---|---|---|
| 1,998,639 | 4/1935 | Roberts | 200/61.28 |
| 2,704,360 | 3/1955 | Werstein | 200/61.28 |
| 2,872,660 | 2/1959 | Ireland | 74/474 |
| 3,110,011 | 11/1963 | Burson | 340/56 |
| 3,217,112 | 11/1965 | Campbell | 200/16 C |
| 3,316,533 | 4/1967 | Kell | 340/56 |
| 3,484,743 | 12/1969 | Stancil | 200/61.27 |
| 3,555,506 | 1/1971 | Daws | 340/73 |
| 3,555,507 | 1/1971 | Burson, Jr. | 340/73 |
| 4,058,797 | 11/1977 | Sekiguchi et al. | 340/73 |
| 4,125,827 | 11/1978 | Roudebush | 340/73 |

Primary Examiner—John W. Caldwell, Sr.
Assistant Examiner—Donnie L. Crosland
Attorney, Agent, or Firm—Hosier, Niro and Daleiden

[57] ABSTRACT

An automatically cancelling turn signal apparatus for a powered vehicle including left turn and right turn indicators. A switch selectively activates the indicators. A mechanism inactivates the indicators responsive to a predetermined increase in vehicle velocity over any base vehicle velocity attained after activating the switch.

8 Claims, 10 Drawing Figures

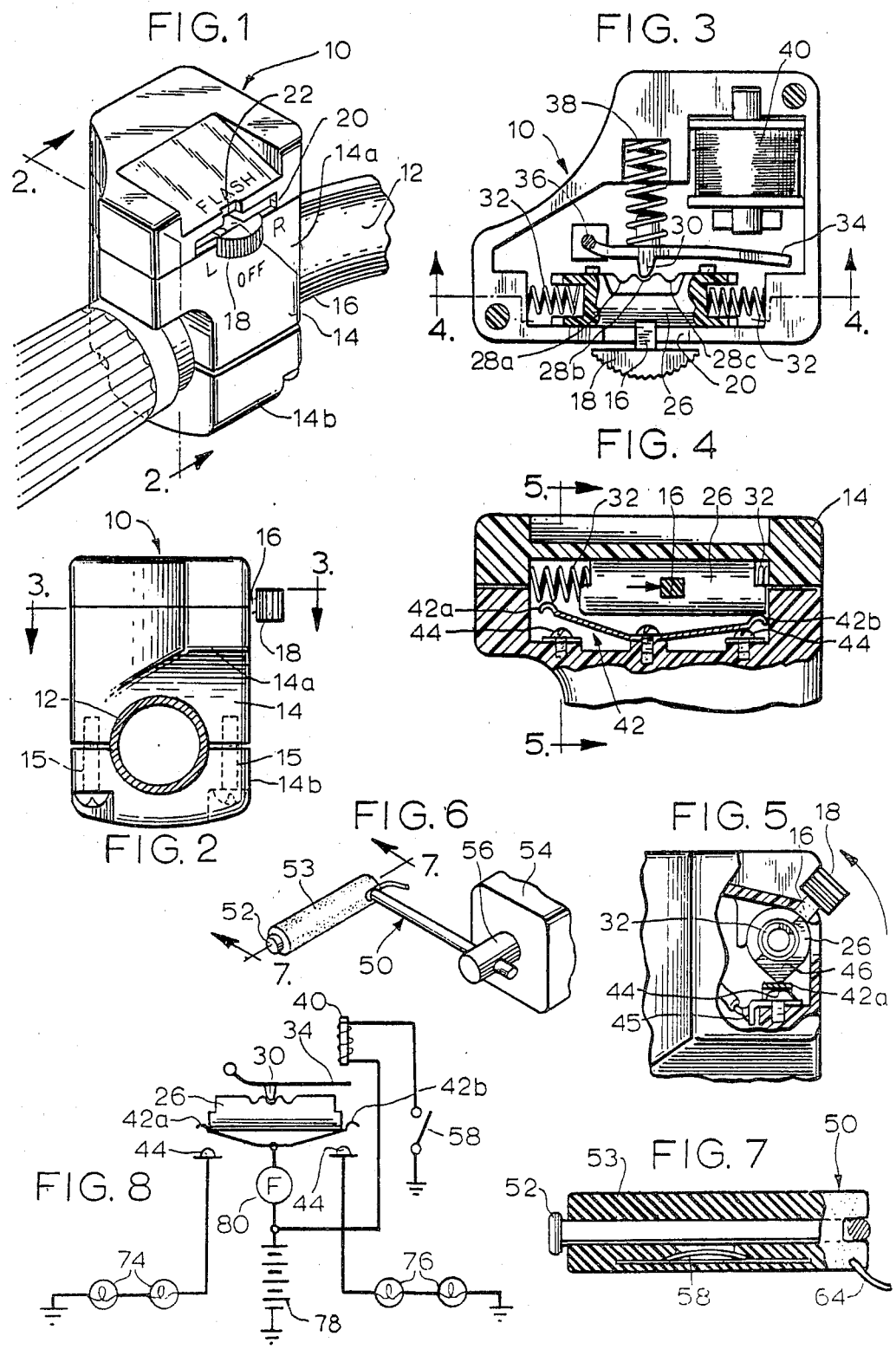

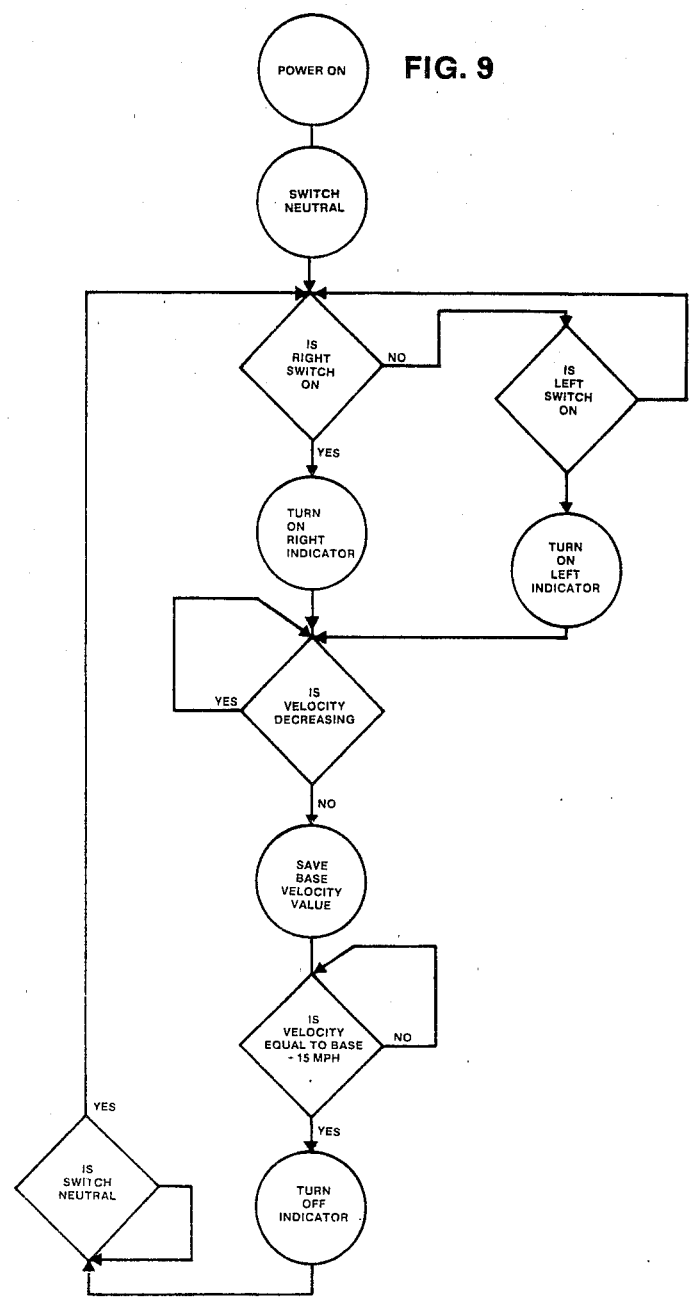

AUTOMATICALLY CANCELLING TURN SIGNAL APPARATUS

This is a continuation-in-part of copending application Ser. No. 397,675, filed Sept. 17, 1973.

The present invention relates to an improved automatically cancelling turn signal, and more specifically to an improved automatically cancelling turn signal for a powered vehicle such as a motorcycle having a component or sub-assembly indicative of vehicle velocity.

Self-cancelling turn signals have long been employed in automobiles, where the turn signal is cancelled by the turning of the steering wheel as the automobile emerges from the turn. While such a system can be satisfactorily employed for automobiles, turn signals are now being provided on other types of powered vehicles, particularly motorcycles, which have no steering wheel. Furthermore, when a motorcycle makes a turn, there is often relatively little turning of the handlebars involved, so that automatic cancellation of a turn signal in response to the turning of the handlebars or front wheel is impractical. As a result, although turn signals are becoming almost universal on motorcycles, such vehicles typically employ manually cancelling turn signals. In some instances, audible signals have been provided in order to alert the rider that a turn signal is operating, but such signals do not provide automatic cancellation.

In accordance with the present invention, there is provided an automatically cancelling turn signal for a powered vehicle which operates in response to a predetermined positive change in the velocity of the vehicle. Ordinarily, when any vehicle rounds a corner, the transmission will be downshifted as the vehicle slows down to approach the corner, and will then upshift as the vehicle emerges from the turn and accelerates to suitable speed. The upshift of the vehicle can therefore be used to provide a signal for the cancellation of the turn signal. While such a system can be used on virtually any motor vehicle having at least two forward speeds, and could even be used on vehicles having automatic transmissions, it is particularly adapted to use on motorcycles having manual transmissions. Since motorcycles are conventionally shifted by means of a foot-operated gear shift lever, the cancelling mechanism may ordinarily be easily connected to this lever. In addition, a predetermined positive change in vehicle velocity may also be used as a condition for turn signal cancellation. When utilizing this embodiment of the invention, the cancelling mechanism may be associated with or connected to any component or sub-assembly of the motorcycle which generates a mechanical or electrical signal indicative of the velocity of the motorcycle.

Generally, the invention provides an automatically cancelling turn signal for a powered vehicle having a speedometer, transmission or other component indicative of vehicle velocity. The turn signal cancelling apparatus comprises left turn and right turn indicator means together with means for selectively activating the indicator means and means for inactivating the turn indicator responsive to a predetermined positive change in vehicle velocity.

FIG. 1 is a perspective view of a turn signal flasher switch mounted on a motorcycle handlebar, the switch embodying certain features of the present invention;

FIG. 2 is a plan view of the switch mechanism shown in FIG. 1, taken along line 2—2 of FIG. 1;

FIG. 3 is a cross-sectional view taken along line 3—3 of FIG. 2;

FIG. 4 is a cross-sectional view taken along line 4—4 of FIG. 3;

FIG. 5 is a cross-sectional view taken along line 5—5 of FIG. 4, and indicating the switch in the "emergency flasher" position;

FIG. 6 is a perspective view of a motorcycle gear shift lever having a switch mounted thereon in accordance with the present invention;

FIG. 7 is a cross-sectional view taken along line 7—7 of FIG. 6;

FIG. 8 is a wiring diagram illustrating an embodiment of the present invention;

FIG. 9 is a flow or program diagram illustrating schematically the logic employed in utilizing change in vehicle velocity as the turn signal cancelling condition.

Figure 10:
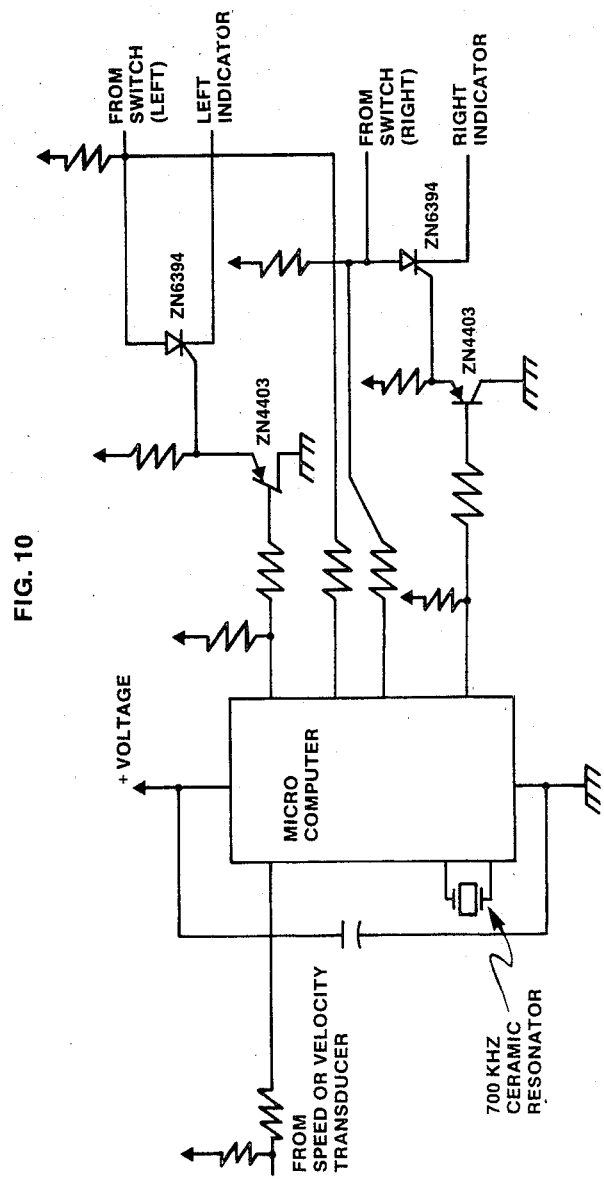
FIG. 10 is an electrical schematic illustrating one electrical circuit useful in implementing the program of FIG. 9.

Referring to FIG. 1, a self-cancelling turn signal switch assembly, generally 10, embodying the features of the present invention is shown mounted on a motorcycle handlebar 12. The switch assembly 10 comprises a housing 14 which is separated into an upper section 14a and lower section 14b, which are attached together with screws 15, as shown in FIG. 2. The upper and lower sections 14a, 14b, respectively, each have arcuate cut-out sections to fit the handlebar 12, as best shown in FIG. 2.

The turn signals are controlled by a thumb-operated lever 16 having an arcuate, knurled control surface 18 which permits easy movement of the lever 16 to the left or right by use of the thumb. Accordingly, the housing 14 has a horizontal slot 20 which permits horizontal movement of the lever 16. In the preferred embodiment shown, the housing 14 also has a vertical slot 22 intersecting the central portion of the horizontal slot 20. This vertical slot 22 permits the upward movement of the lever 16 when it is in the central position of the horizontal slot 20, in order to activate the four-way flashers as hereinafter described.

Referring to FIG. 3, it is seen that the thumb-operated lever is connected to a slide-type switch having a sliding member 26, which is slidable in a horizontal direction to the left and right. In the preferred embodiment, the sliding member is also rotatable about its horizontal axis, as shown in FIG. 5, in order to permit activation of the four-way flashers.

As shown in FIG. 3, the sliding member 26 has cammed detents 28a, 28b, 28c, together with a cam follower 30 engaging the detents 28. As can be seen in FIG. 3, the detents 28 define left, center (or "off") and right positions for the sliding member 26, the left position being defined by the right detent 28c, the center or "off" position by the center detent 28b, and the right position by the left detent 28a. The sliding member 26 is biased toward the center position by a pair of coil springs 32 mounted between the ends of the sliding member 26 and the interior of the housing 14.

The cam follower 30 is mounted on a lever 34 which is hinged at one end at a pin-type hinge 36. The cam follower 30 is biased by a spring 38 into engagement with the cammed detents 28. As shown in FIG. 3, the housing 14 also contains an electromagnet 40 which can be activated in order to move the cam follower 30 out of engagement with the detents 28. In the embodiment shown, when the electromagnet 40 is activated, the lever 34 is drawn into contact with the electromagnet 40, thus moving the cam follower 30 out of engagement with the detents 28. Of course, the lever 34 must be made of a suitable ferromagnetic material.

In FIG. 4, the sliding member 26 is shown in its right position, as would be employed to engage a signal for a right-hand turn. Movement of the sliding member 26 to the left or right engages a leaf switch 42 having left and right leaves 42a, 42b, respectively, with contacts 44, in order to complete a circuit and activate the turn indicator lights. As shown in FIGS. 4 and 5, the contacts 44 are suitably insulated from the housing 14, and are connected to wires 45 in order to complete a circuit. In the center position, as shown in FIG. 3, the leaf switch 42 is not engaged with either contact, and the turn signals are therefore off.

Referring to FIG. 5, it is seen that the sliding member 26 also has a cammed surface portion 46 projecting radially outwardly from its horizontal axis. This cammed portion 46 permits the simultaneous engagement of both leaves 42a, 42b, with their associated contacts 44 by movement of the thumb-operated lever 16 in an upward direction when the sliding member 26 is in its center position. This simultaneous engagement of the left and right leaves 42a, 42b, respectively, permits the use of the turn indicators as a four-way emergency flasher.

FIG. 6 shows a conventional, generally L-shaped motorcycle foot-operated gearshift lever 50 having a toe-contact portion 52, which includes a rubber pad 53. The gearshift lever 50 is connected to the motorcycle transmission housing 54 via a shaft 56, which operates the gear-change mechanism. In the embodiment shown, the apparatus of the present invention is mounted for use on a motorcycle in which upshift is accomplished by an upward movement of the gearshift lever 50 by contacting the bottom of the toe-contact portion 52 with the foot. However, many motorcycles have an opposite shift pattern, wherein upshifting is accomplished by downward pressure on the toe-contact portion 52, and it will be appreciated that the present invention can be equally well adapted to such a shift pattern. Similarly, in some instances the gearshift lever is mounted on the right-hand side of the motorcycle instead of the left-hand side as shown. Obviously, the present invention is equally well adapted to such mounting.

Referring to FIG. 7, the electromagnet 40 is activated by upshifting the motorcycle, in this instance by upward movement of the lever 50 as accomplished by toe-contact with the underside of the toe-contact portion 52. As shown in FIG. 7, such contact completes a circuit by moving a contact strip 58 embedded in the rubber pad 53 into contact with the metal toe contact portion 52 of the lever 50. Such contact with the metel lever 50 completes a circuit between a wire 64 and ground, as shown in the wiring diagram in FIG. 8.

FIG. 8 is a diagrammatic wiring diagram of a motorcycle or the like equipped with a self-cancelling turn signal embodying the features of the present invention. As shown in FIG. 8, the system includes front and rear left turn signal lights 74, front and rear right turn signal lights 76, a battery 78, and flasher 80. Of course, the power supply, shown as a battery 78 also normally includes a generator, alternator, or the like, when the motorcycle is in operation. The operation of the turn signal system of the present invention is best described in connection with FIG. 8.

Assuming that the operator of the motorcycle desires to make a right turn, he moves the knurled knob 18 in a right-hand direction, causing the sliding member 26 to move to the right, so that the cam follower 30 engages the left-hand cammed detent 28a. Such movement causes the right leaf 42b to engage its associated contact 44, as shown in FIG. 4. As can be seen in FIG. 8, this completes circuit between the battery 78 and the right turn signal lights 76 through the flasher 80.

As the motorcycle emerges from the turn, the rider will ordinarily upshift by pressing upwardly on the toe-contact portion 52 of the gearshift lever 50, thus causing the contact strip 58 to be grounded, activating the electromagnet 40. Again, as can be seen in FIG. 8, this completes a circuit which activates the electromagnet 40, moving the lever 34 into contact with the electromagnet 40, so that the sliding member 26 is returned to its center position by the coil springs 32.

Of course, the turn signal of the present invention can also be manually cancelled in the event that no upshift is used, as may be the case, for example, when changing lanes on an expressway. Manual cancellation is acomplished by simply moving the thumb-operated lever 16 to its center position.

In accordance with an alternative embodiment, the turn signal of the powered vehicle is automatically cancelled in response to a predetermined positive change in vehicle velocity. Preferably, the velocity change is measured from the lowest or base velocity attained during the turn. Thus, as illustrated in FIG. 9, the turn indicator means will not be cancelled until the apparatus senses, a positive change of, for example, 15 miles per hour over the base velocity.

A variety of electrical components and any number of circuits will be apparent to those skilled in the art to effect the program of FIG. 9. One such circuit is illustrated in FIG. 10 and includes as a primary component a one chip microcomputer such as that manufactured by Motorola, Inc. under the trade designation MC 141000, P suffix. The microcomputer monitors the velocity input signal and the left and right turn indicator input signals to energize or deenergize the Zn 6394 silicon controlled rectifiers according to the program contained in the microcomputer memory.

In operation the apparatus of FIGS. 9 and 10 is inactive until a switch, such as that shown in FIG. 1, is actuated. At that time the appropriate turn signal is activated and the microcomputer monitors vehicle velocity. When the velocity attains its lowest value during the turn and then increases over this lower value by a predetermined amount, the circuitry inactivates the turn signal. The switch must also be returned to a neutral position, either manually or automatically, before the apparatus will function. This prevents multiple activation of the apparatus on one switch actuation.

As can be appreciated from the foregoing description of the invention, the turn signal cancelling device of the present invention, while particularly adapted to motorcycles, can also be used in other types of vehicles. The particular switching means shown are not the only means that can be used, and, for example, the electromagnet 40 could be wired directly to a switch in the transmission, so that the present invention could even operate in connection with an automatic transmission having two or more speeds. In addition, the apparatus of FIGS. 9 and 10 can be connected to the vehicle speedometer, transmission, wheel or other subassembly rotating with a wheel, or any other vehicle component which is indicative of velocity.

Obviously, many modifications and variations of the invention as hereinbefore set forth will occur to those skilled in the art, and it is intended to cover in the appended claims all such modifications and variations as fall within the true spirit and scope of the invention.

I claim:

1. An automatically cancelling turn signal apparatus for a powered vehicle comprising:

left turn and right turn indicator means;

switch means for selectively activating said indicator means; and means for inactivating said indicator means responsive to a predetermined increase in vehicle velocity over any base vehicle velocity attained after activating said switch means.

2. The automatically cancelling turn signal apparatus of claim 1 wherein said inactivating means is responsive to a positive change in vehicle velocity of between about 5 mph and 30 mph.

3. An automatically cancelling turn signal apparatus for a powered vehicle having a component indicative of vehicle velocity, said apparatus comprising:

left turn and right turn indicator means;

switch means for selectively activating said indicator means; and means associated with said vehicle component for inactivating said indicator means responsive to a predetermined increase in vehicle velocity over any base vehicle velocity attained after activating said switch means.

4. The automatically cancelling turn signal device of claim 3 wherein said vehicle component is a speedometer.

5. The automatically cancelling turn signal device of claim 3 wherein said vehicle component is a transmission.

6. The automatically cancelling turn signal apparatus of claim 3 wherein said vehicle component is a wheel or a part of the vehicle rotating with said wheel.

7. The automatically cancelling turn signal apparatus of claim 3 wherein said inactivating means is responsive to a predetermined increase in vehicle velocity over the lowest vehicle velocity attained after activating said switch means.

8. An automatically cancelling turn signal apparatus for a powered vehicle comprising:

left turn and right turn indicator means;

switch means for selectively activating said indicator means;

means for monitoring vehicle velocity;

means associated with said monitoring means for storing a velocity of the vehicle; and means for inactivating said indicator means (a) after activating said switch means and (b) responsive to a predetermined increase in vehicle velocity over any base vehicle velocity monitored by said monitoring means.

* * * * *